United States Patent [19]
Darden et al.

[11] 3,798,540
[45] Mar. 19, 1974

[54] ELECTRICAL GROUNDING AND INSULATION RESISTANCE TESTER

[76] Inventors: Levin D. Darden, P.O. Box 35, Hollister, Fla. 32047; Richard E. Morrison, 509 Bon Ami, Deridder, La. 70634

[22] Filed: June 28, 1972

[21] Appl. No.: 267,034

[52] U.S. Cl. .................................................. 324/51
[51] Int. Cl. ............................................ G01r 31/02
[58] Field of Search .................... 314/51, 54; 317/18

[56] References Cited
UNITED STATES PATENTS

| | | | |
|---|---|---|---|
| 2,806,993 | 9/1957 | Matousek | 324/51 |
| 2,858,507 | 10/1958 | Liautaud et al. | 324/51 X |
| 3,141,128 | 7/1964 | Behr | 324/51 |
| 3,277,364 | 10/1966 | Abrahamson | 324/51 X |
| 3,525,038 | 8/1970 | Felt et al. | 324/51 |
| 3,643,157 | 2/1972 | Ettelman | 324/51 |
| 3,648,163 | 3/1972 | Pinner et al. | 324/51 |
| 3,611,133 | 10/1971 | Tsergas | 324/51 |

Primary Examiner—Gerard R. Strecker
Attorney, Agent, or Firm—George H. Baldwin; Arthur G. Yeager

[57] ABSTRACT

A fail-safe safety testing device for electrical hand tools and the like which automatically indicates that the insulation resistance of the tool and its associated power cord and plug exceeds a predetermined value and that the connection is continuous between the frame of the tool and the grounding prong of the power cord plug by causing an indicating lamp to be illuminated upon concurrence of such conditions. When the tool is unsafe as to either or both of these conditions, the lamp does not light up.

12 Claims, 4 Drawing Figures

PATENTED MAR 19 1974 3,798,540

ELECTRICAL GROUNDING AND INSULATION RESISTANCE TESTER

Industrial safety requires frequent testing of electrical hand tools and the like equipment for continuity of grounding circuits and for insulation resistance. While there are, of course, resistance measuring instruments and continuity testers adapted for use by technicians, it is highly desirable that such tests may be made by unskilled persons and it is an object of the present invention to provide an inexpensive, portable, fail-safe, automatic, go-no go, ground circuit continuity and insulation resistance tester.

It is a further object of the invention to provide an automatic ground circuit continuity and insulation resistance tester for electrical hand tools and the like which may be operated in any position and of which the mechanically movable parts are held to a minimum.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing, in which:

Figure 1:
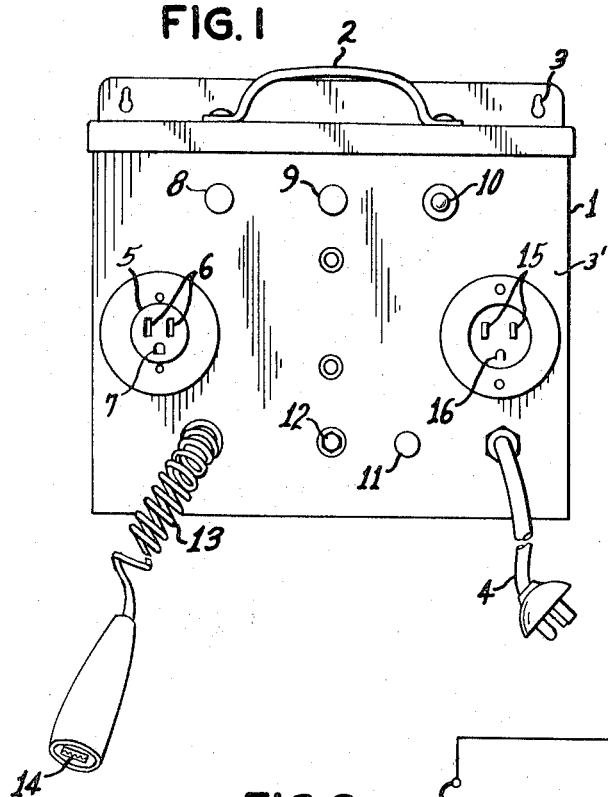
FIG. 1 is a front elevational view of a tester embodying the invention.

As shown in FIG. 1 the portable cabinet 1 is provided with a carrying handle 2 and with suitable temporary mounting or hanging means 3. A suitable power source including a power cord and plug 4 is provided for energizing the tester. The front panel 3' carries a standard three-way receptacle or socket 5, including female connectors 6 for the prongs of the plug which carry power to a power tool of the type which it is desired to test and a female connector 7 for the prong normally provided for such tools for the frame or casing grounding circuit.

The front panel is further provided with a lamp test switch push-button 8, a main test switch push-button 9, an indicator lamp 10, a fuse holder 11 and a ground test stud 12. There is also provided an insulated, self coiling extension cord conductor 13 terminating in an insulated alligator clip 14, the cord and alligator clip being electrically directly connected internally of the cabinet to the ground test stud.

Recessed into the panel is a male receptacle having male spade connectors 15 and a cylindrical prong 16 adapted to make connections to a socket or female plug connector of the type normally provided at the output end of an extension cord, for receiving the male prongs of the plug of the power cord of an electrical tool.

The insulation resistance and ground continuity of an electric hand tool or other plug-in electrical equipment are tested by engaging the power cord plug of the tool in socket 5 and by making contact with an uninsulated frame portion of the tool or appliance, either against test stud 12 or with alligator clip 14. The test is made by depressing push-button 9. The tester may also be used to determine insulation resistance and ground continuity of an extension cord by plugging the plug end thereof into socket 5 and by engaging the contacts 15 and 16 in the female plug at the opposite end of the extension cord, and by then depressing push-button 9. It will be understood that the power cord plug 4 has first been plugged into a suitable source of 115 volt a.c. power, or that the device is otherwise suitably provided with a source of power.

Figure 3:
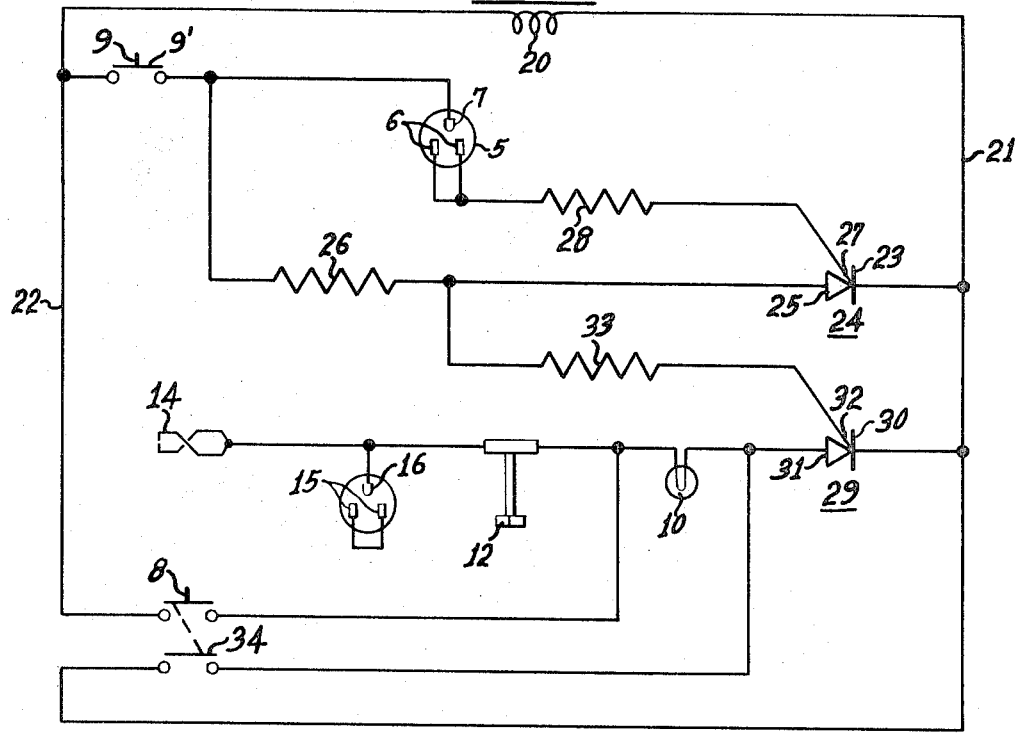
FIG. 3 is a schematic diagram showing one circuit for the tester.

The circuit of the tester as shown in FIG. 3 includes a ground connection from power source 4 to cabinet 1 as indicated at 17, and power connections through a fuse 11', which is housed in holder 11, to the primary 18 of a step-down power transformer 19, of which the secondary 20 provides an output of typically, 25 volts, this being selected to be a safe voltage and not high enough to provide any substantial electric shock to the person testing a tool even if the tool is defective.

When the tester is suitably powered, the voltage of about 25 volts appears between conductors 21 and 22. The cathode 23 of silicon controlled rectifier (SCR) 24 is connected to conductor 21 and the anode 25 thereof is connected through a resistor 26 which may be of 100K ohms and through main test switch 9' to conductor 22. The control electrode or trigger 27 of rectifier 24 is connected through a resistor 28 to the interconnected female connectors 6 of socket 5. The grounding terminal 7 of the socket 5 is connected through the main test switch 9' to conductor 22. Resistor 28 is typically of 47K ohm value and rectifier 24 is typically an E.C.C. Corporation sensitive SCR Thyristor, type BO1608.

There is thus provided a first circuit responsive to the resistance between terminals 6 and 7 of socket 5. If a power tool or the like is plugged into socket 5, and if its insulation resistance throughout the tool as measured between the power circuits therein, associated with terminal 6, and the ground connection for the tool, connected to terminal 7, is less than about 150K ohms, a positive voltage is supplied to trigger 27 causing conductance of rectifier 24. Such conduction occurs, of course, only during the part of the cycle in which conductor 22 is positive with respect to conductor 21, since the voltage between conductors 21 and 22 is alternating current and no current can flow through rectifier 24 except during the half-cycle when conductor 21 is negative with respect to conductor 22.

A second circuit is provided which includes an SCR 29, which may be of the same type as SCR 24, which has a cathode 30 similarly connected to conductor 21, and which further comprises an anode 31 and control electrode or trigger 32. The bias or gate voltage on electrode 32 with respect to cathode 30 is dependent upon the conductive condition of rectifier 24. When rectifier 24 is conductive, the voltage on its anode 25 is very nearly equal to the voltage of conductor 21 and the bias supplied through resistor 33, typically of 47K ohms, is not sufficiently positive with respect to cathode 30 to trigger rectifier 29 into conduction (during the half cycle that conductor 22 is positive).

This explanation presupposes, of course, that the main test switch 9' is closed. It will be seen that when SCR 24 is not conductive, the gate trigger voltage appearing on electrode 32 approaches the voltage on conductor 22 and that, accordingly, the SCR 29 will be provided, during the half cycle in which conductor 22 is positive with respect to conductor 21, with a gating potential with respect to cathode 30 sufficiently positive to trigger and cause SCR 29 to conduct.

The anode 31 of SCR 29 is connected in series through lamp 10 to three ground connectors or contacts, including test stud 12, male grounding prong 16 and alligator clip 14. It will be apparent that SCR 29 may conduct through lamp 10 only if a connection is completed from test stud 12 or prong 16 or alligator clip 14 to conductor 22. Such a connection is normally made by a hand tool in good condition by engaging a conductive part of the frame or casing for the tool with stud 12 while the power cord of the tool is plugged into socket 5. Alternatively, if it is not convenient to touch an uninsulated part of the tool frame or casing to test stud 12, the same result may be achieved by clipping alligator clip 14 to some uninsulated part of the tool frame.

When a tool is plugged into socket 5, and if the tool be a hand drill, the drill bit chuck or a part of the metal motor housing or the like, is placed against stud 12, with the main test switch 9' depressed, SCR 24 will not conduct if the insulation of the tool is sufficiently high. With this condition of SCR 24, SCR 29 will be biased toward conduction during the half-cycle that conductor 22 is positive and, if the ground circuit is continuous from the frame of the tool to its grounding prong which is engaged with connector 7 of socket 5, current will flow from conductor 21 through SCR 29, through indicator lamp 10 and to stud 12, thence to the tool frame and through the grounding conductor in its power cord to terminal 7 and finally through switch 9' to conductor 22. It will be apparent that it is irrelevant whether contact with the tool frame is made by means of test stud 12 or alligator clip 14.

Should the internal resistance of the tool plugged into socket 5 be less than 150K ohms, the bias on control electrode 27 will be sufficiently positive, during the active half-cycle when conductor 22 is positive, to cause SCR 24 to conduct. As previously explained, conductance of SCR 24 holds off SCR 29 and then no current may flow through lamp 10 regardless of whether the grounding circuit of the tool between stud 12 and grounding connector 7 is complete, and lamp 10 will not be illuminated. If the internal resistance of the tool is sufficiently high that SCR 24 remains nonconductive, SCR 29 may conduct. However, if the ground circuit from stud 12 through the tool and its grounding conductors to socket terminal 7 is interrupted, no circuit is completed through lamp 10. It will thus be apparent that illumination of lamp 10 necessarily indicates that the tool is safe, that the tool and its associated power cord and plug have sufficiently high insulation resistance, and the frame of the tool is properly grounded through its grounding circuit from the frame to the grounding terminal of its power plug.

In order to test an extension cord separately and apart from a tool or the like, the male plug is engaged in socket 5 and the female plug or receptacle at the opposite end is engaged on terminals 15 and 16. Now when test switch 9' is closed, SCR 24 will remain nonconductive unless the insulation resistance of the power cord is less than 150K ohms, and, if the ground circuit is completed through the cord from prong 16 to connection 7, SCR 29 may conduct through lamp 10 to prong 16 and then through the ground wire of the extension cord to connection 7 and on through switch 9'. It will be apparent that, in either case, a glowing lamp 10 indicates satisfactory grounding continuity and satisfactory insulation resistance of the apparatus under test.

Should lamp 10 burn out, there is no false indication that the tool is in satisfactory condition. In order that the bulb may be readily tested, however, it is convenient to provide a double pole switch 34 operated by push-button 8 for temporarily connecting conductors 21 and 22 across the lamp.

In using the circuit of FIG. 3, it may be necessary to use care in selecting BO 1608 Thyristors which operate properly in the circuit. The circuit of FIG. 4 utilizes a different type of SCR having more uniform characteristics, and the circuit of FIG. 4 rejects, by non-illumination of the indicating lamp, tools having insulation resistance of less than approximately 400 K ohms to 600 K ohms.

Figure 4:
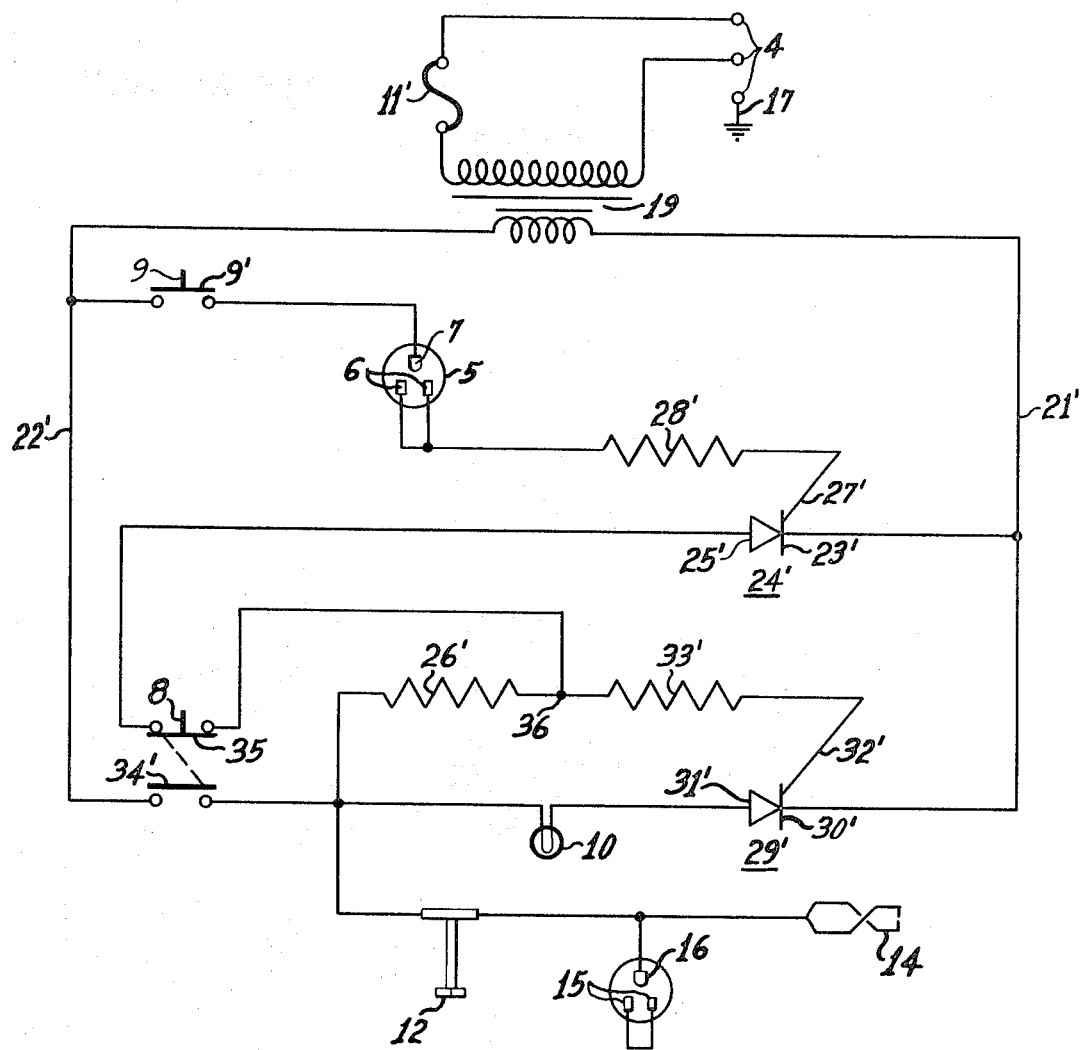
FIG. 4 is a schematic diagram showing a modified preferred circuit for the tester.

The modified circuit of FIG. 4 is adapted to the use of SCR's of type IR 106 F1 and the circuit of SCR 24' is rearranged from that of the generally corresponding SCR 24 of FIG. 3.

Figure 2:
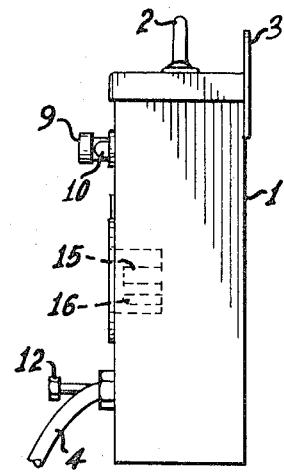
FIG. 2 is a side elevational view of the tester as shown in FIG. 1.

In FIG. 4, several of the elements are lettered identically to those shown in FIGS. 1 – 3 and these elements will be understood to be as previously described, whereas, as to those elements identified with numerals to which prime marks have been supplied, the elements generally correspond to those of FIG. 3.

In FIG. 4, the anode 25' of the type IR 106 F1 SCR 24' is connected to normally closed contacts 35 of the double pole switch operated by push button 8, the contacts 34' of this switch being normally open. The connection from anode 25' is completed through normally closed contacts 35 and through series resistor 26', typically of 100 K ohms, to one side of indicating lamp 10 and to test stud 12, male grounding prong 16 and alligator clip 14.

When a tool is now connected for testing by being plugged into socket 5, and when its frame or casing is placed in contact with the test stud 12 or alligator clip 14, and, if the ground connection of the tool is complete, closing of switch 9' will complete the circuit from conductor or bus 21' through cathode 23' of transistor 24', anode 25', switch contacts 35 and resistor 26' to stud 12 (or the clip), and thence through the tool grounding circuit to terminal 7 and through switch 9' to bus 22'. If the insulation resistance between the power circuit of the tool and its frame and grounding circuit is greater than about 400 K ohms or 600 K ohms, the trigger 27' will be sufficiently isolated from bus 22' that SCR 24' will not conduct, and the trigger voltage on SCR 29' will remain close to that on bus 22', such voltage being applied thereto through resistor 33', resistor 26', test stud 12, and through the tool grounding circuit to socket connector 7 and switch 9' to bus 22'. Resistor 33' is, typically, of 47 K ohms.

If the tool grounding circuit is incomplete, SCR 24' cannot conduct regardless of insulation resistance because the grounding circuit of the tool in the FIG. 4 circuit is a part of the circuit from anode 25' to bus 22'.

If the insulation resistance of the tool is less than 400 K ohms or 600 K ohms, the voltage on trigger 27' approaches that of bus 22', such voltage being applied through resistor 28' and through the insufficiently high resistance of the tool from socket terminals 6 to terminal 7. Under this condition, assuming a complete grounding circuit of the tool, SCR 24' will conduct causing the junction 36 of resistors 26' and 33' to approach the voltage of bus 21', and this voltage, applied through resistor 33' to trigger element 32', will not cause conduction of SCR 29'.

Finally, if the conditions of the tool grounding circuit and insulation resistance are satisfactory, SCR 24' will not conduct, because the resistance from terminals 6 to terminal 7 of socket 5 is high, no load current of SCR 24' will flow in resistor 26', and the voltage of bus 22' will be applied through the tool ground circuit to stud 12 and thence through resistors 26' and 33' to the trigger 32' of SCR 29', thereby causing conduction. The load circuit of SCR 29' extends from bus 21' to cathode 30', anode 31' and through lamp 10 to stud 12, and finally through the tool ground circuit to terminal 7 and switch 9' to bus 22'. Current flow through this circuit causes lamp 10 to illuminate indicating satisfactory condition of the tool and its power cord.

The circuit of FIG. 4 may be used to test extension cords by following the procedure explained above in connection with FIG. 3.

Switch button 8 of the FIG. 4 circuit is depressed to test lamp 10, and, incidentally, SCR 29'. When contacts 35 open and contacts 34' close, trigger 32' is connected through resistors 33' and 26' to bus 22' and current flows through the SCR and the lamp in series. Thus SCR 29' is caused to conduct independent of any influence from SCR 24' and illuminating current is supplied to lamp 10 independent of any connection between stud 12 or clip 14 and connector 7. If the lamp fails to illuminate when a tool is under test, button 8 may be depressed to test the circuit of the tester, the tool either remaining connected or being removed as As in the FIG. 3 circuit, it will be understood that conduction of the SCR's in the FIG. 4 circuit occurs during the half cycle that bus 22' is positive with respect to bus 21'.

It will be apparent that electrical kitchen appliances, hair dryers, hand drills, grinders, sanders, saber saws, circular saws, and routers, soldering irons, nut drivers, and other portable electrical apparatus and equipment, of any type which is provided with a power and grounding cord and plug, may readily be safety tested with the apparatus herein disclosed. Moreover, the alligator clip permits testing of table saws, milling machines, lathes, drill presses and the like which employ power plugs. The tester may be provided, if desired, with other sizes of power and ground connection sockets to match the plugs employed on the equipment to be tested, and, while the tester is shown as specifically adapted for testing 115 volt a.c. equipment, the invention is equally applicable to other voltage ratings, such as for 230 volt equipment.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by letters Patent of the United States is:

1. A tester, for testing electrical hand tools and the like of the type having a power connection plug which includes two power terminals and a grounding terminal, said tester comprising two electron discharge devices having control electrodes, an electric power source, one of said devices having a load circuit connected to said power source, a normally open circuit having two contacts adapted for connection respectively to the grounding terminal and to at least one of the power terminals of the plug of the tool or the like, said contacts being in a circuit from said source to said control electrode of said one of said devices for biasing said one device into conductive condition in response to insulation resistance of the tool or the like as measured between the grounding terminal and the one power terminal of less than a predetermined resistance, the control electrode of the other said device being connected to said load circuit of said one device and operative to bias said other device in conductive condition in response to non-conduction of said one device and in non-conductive condition in response to conduction of said one device, and a second load circuit for said other device connected to said source and comprising a current indicating means in series with contact means adapted for connecting to a conductive part of the frame of the tool and said second load circuit further comprising in series said contact which is adapted for connection to the grounding terminal, said second load circuit being adapted to be completed by a continuous grounding circuit of the tool from its frame to the grounding terminal of its plug.

2. The combination according to claim 1 wherein said electric power source is a source of alternating current voltage.

3. An automatic insulation resistance and grounding tester for electrical equipment of the type having a connector plug with at least two power terminals and one grounding terminal, said tester comprising a first normally non-conductive rectifier having a control electrode, means for supplying a positive voltage to said control electrode comprising contact means adapted to be connected in series with the grounding terminal and at least one of the power terminals of the plug of the equipment to be tested, said rectifier being biased for conduction when the insulation resistance of the equipment to be tested is low, a first load circuit for said first rectifier, a second normally conductive rectifier having a control electrode, a respective second load circuit for said second rectifier, said control electrode for said second rectifier being connected to said first load circuit and responsive to conductance of said first rectifier to be biased to a cut off voltage of said second rectifier, said second load circuit comprising current indicating means connected in series with a test terminal adapted to be in electrical contact with a portion of the equipment to be tested for proper connection to the grounding terminal of the plug thereof, and with said contact means adapted to be connected to the grounding terminal of such plug, said indicating means indicating current flow in said second load circuit.

4. An automatic insulation resistance and grounding tester for electrical equipment of the type having a connector plug with at least two power terminals and one grounding terminal, and such equipment having a conductive portion normally groundingly connected to such grounding terminal, said tester comprising a first normally non-conductive rectifier having a control electrode, circuit means including an open circuit adapted to be effectively closed by connection thereacross of the grounding terminal and a power terminal of the equipment plug when the insulation resistance of such tool is low and to remain effectively open when such insulation resistance is high, said circuit means being operative to supply a positive voltage to said control electrode to trigger conduction of said rectifier when said open circuit is effectively closed and being inoperative to trigger said rectifier when said open circuit is effectively open, whereby said rectifier conducts when such equipment having low insulation resistance is so connected, a first load circuit for said first rectifier, a second normally conductive rectifier having a control electrode, a respective second load circuit for said second rectifier, said control electrode for said second rectifier being connected to said first load circuit and responsive to conductance of said first rectifier to cut off said second rectifier, said second load circuit comprising indicating means connected in series with a test terminal adapted to be placed in electrical contact with such conductive portion of the equipment, and a second test terminal adapted to be placed in electrical contact with such grounding terminal of such plug of the equipment. said second load circuit being open between said test terminals in the absence of such electrical connections of such equipment.

5. In a tester for electrical hand tools and the like having a power connection plug including two power connector terminals and a grounding terminal, the combination comprising a source of power, first circuit means connected to said source and including two test terminals and being operative between a first condition and a second condition, said circuit means being responsive to resistance between said test terminals to be in said first condition when such resistance is less than a predetermined value and in said second condition when such resistance is greater than said predetermined value, second circuit means including switch means responsive to the condition of said first circuit means, said switch means being normally conductive in response to said second condition of said first circuit means, said second circuit means further including an electrically actuated indicating means responsive to conduction through said switch, and means adapted for connecting grounding portions of such hand tool or the like to be tested for continuity in series with said switch means across said source, said two test terminals being adapted to be connected respectively to the grounding terminal and to at least one of the power connector terminals of such hand tool or the like for testing the insulation resistance thereof, whereby said indicator is energized when the insulation resistance of such tool or the like between the grounding terminal and power connection terminal of its plug is higher than said predetermined value and when concurrently such continuity exists between such portions.

6. In a safety tester for an electrical tool having a power connection plug including two power terminals and a grounding terminal and such tool further including a frame portion and a normally continuous grounding connection between such frame portion and such grounding terminal, the combination of, a first bus and a second bus, power means for causing said first bus to be electrically positive with respect to said second bus, a first and a second electron discharge device each having a respective anode, cathode and control electrode, a first anode-cathode load circuit for said first device between said buses in which the cathode of the device is oriented toward said second bus and the anode is oriented toward said first bus, means adapted to connect the control electrode of said first device to said first bus through the insulation resistance of the tool between such grounding terminal and power terminals thereof for applying when said first bus is positive a positive triggering voltage to said control electrode in response to said insulation resistance being less than a predetermined value, a second load circuit for said second device between said buses in which the cathode of the device is oriented toward said second bus and the anode is oriented toward said first bus, said second load circuit including an electrical indicator device in series therein, the control electrode of said second device being connected to said first load circuit and responsive to conductance of said first device to apply to said control electrode of said second device a voltage less positive than the voltage required to trigger said device, said second load circuit having an open circuit portion in series therein adapted to be closed by connection of the grounding terminal and such frame portion of the tool across such open circuit portion thereby to close said second load circuit when such grounding connection of the tool is continuous.

7. The combination according to claim 6 wherein said open circuit portion adapted to be closed by such grounding connection from such frame portion to such grounding terminal of the tool is common to said load circuits.

8. The combination according to claim 7 wherein said control electrode of said second device is provided with a positive voltage sufficient to trigger said second device in response to non-conduction of said first device.

9. The combination according to claim 6 wherein said first load circuit is complete between said buses in the absence of the tool, and wherein said control electrode of said second device is provided with a positive triggering voltage from said first load circuit in response to non-conduction of said first device.

10. The combination according to claim 6 wherein said power means provides alternating current voltage to said buses whereby said first bus is intermittently positive with respect to said second bus.

11. The combination according to claim 8 wherein said power means provides alternating current voltage to said buses whereby said second device is triggered into conduction in response to non-conduction of said first device during the half cycles in which said first bus is positive with respect to said second bus.

12. In a tester for an electrical tool or the like having a connector plug with at least two power terminals and a grounding terminal, the combination of a first electron discharge device having a control electrode, an opening biasing circuit to said control electrode adapted to be closed by the connection thereinto of the grounding terminal and a power terminal of the plug of a tool to be tested when the insulation resistance of the tool is less than a predetermined resistance and operative when so closed to bias said device for conduction, said first device being provided with a load circuit, a second electron discharge device including a respective control electrode connected to said load circuit of said first device and being biased by a voltage on said load circuit for conduction in response to non-conduction of said first device, an open load circuit for said second device adapted to be closed by the connection thereinto of the grounding terminal of the plug and the frame of the tool to be tested when the grounding connection between the frame and grounding terminal of the plug of the tool is continuous, and means for indicating the flow of current in said load circuit of said second device.

* * * * *